(12) United States Patent
Iwamoto et al.

(10) Patent No.: US 12,050,465 B2
(45) Date of Patent: Jul. 30, 2024

(54) MANAGEMENT SYSTEM, MANAGEMENT METHOD, AND PROGRAM

(71) Applicant: Toyota Jidosha Kabushiki Kaisha, Toyota (JP)

(72) Inventors: Kunihiro Iwamoto, Nagakute (JP); Yuta Itozawa, Nagoya (JP); Hirotaka Komura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 17/408,961

(22) Filed: Aug. 23, 2021

(65) Prior Publication Data

US 2022/0066449 A1 Mar. 3, 2022

(30) Foreign Application Priority Data

Aug. 25, 2020 (JP) ................. 2020-141499

(51) Int. Cl.
  *G05D 1/00* (2024.01)
  *G06Q 10/0631* (2023.01)
  *G06Q 10/08* (2024.01)
  *G06Q 10/30* (2023.01)

(52) U.S. Cl.
  CPC ..... *G05D 1/0088* (2013.01); *G06Q 10/06312* (2013.01); *G06Q 10/06315* (2013.01); *G06Q 10/08* (2013.01); *G06Q 10/30* (2013.01)

(58) Field of Classification Search
  CPC .................................................. G05D 1/0088
  See application file for complete search history.

(56) References Cited

U.S. PATENT DOCUMENTS

| | | | |
|---|---|---|---|
| 11,231,706 B1* | 1/2022 | Curlander | ................ B25J 5/005 |
| 2017/0086230 A1* | 3/2017 | Azevedo | ................. H04L 67/12 |
| 2018/0158020 A1 | 6/2018 | Khasis | |
| 2018/0364713 A1 | 12/2018 | Foster, II et al. | |
| 2019/0236519 A1 | 8/2019 | Kaneko et al. | |
| 2020/0175471 A1 | 6/2020 | Tsuruta et al. | |
| 2020/0300659 A1 | 9/2020 | Miwa et al. | |

(Continued)

FOREIGN PATENT DOCUMENTS

| | | |
|---|---|---|
| CN | 111267704 A | 6/2020 |
| CN | 111724101 A | 9/2020 |
| CN | 111724102 A | 9/2020 |

(Continued)

*Primary Examiner* — Imran K Mustafa
(74) *Attorney, Agent, or Firm* — Dinsmore & Shohl LLP (57) ABSTRACT

A management system, a management method, and a program capable of reducing occurrence of delivery failures by an autonomous mobile robot are provided. The management system is a management system configured to manage a delivery by an autonomous mobile robot that delivers a package to a delivery destination, the management system including: an environment information acquisition unit configured to acquire environment information, which is information regarding an environment that inhibits a delivery by the autonomous mobile robot in the vicinity of the delivery destination; and a delivery determination unit configured to determine whether or not to cause the autonomous mobile robot to deliver the package to the delivery destination based on the environment information.

11 Claims, 5 Drawing Sheets

(56) References Cited

U.S. PATENT DOCUMENTS

2020/0301451 A1    9/2020   Miwa et al.

FOREIGN PATENT DOCUMENTS

| EP | 3362865 A1 | 4/2017 |
| JP | 2009-274875 A | 11/2009 |
| JP | 2020090152 A | 6/2020 |
| WO | 2017/064202 A1 | 4/2017 |

* cited by examiner

MANAGEMENT SYSTEM, MANAGEMENT METHOD, AND PROGRAM

CROSS REFERENCE TO RELATED APPLICATIONS

This application is based upon and claims the benefit of priority from Japanese patent application No. 2020-141499, filed on Aug. 25, 2020, the disclosure of which is incorporated herein in its entirety by reference.

BACKGROUND

The present disclosure relates to a management system, a management method, and a program, and in particular, to management for deliveries.

In recent years, there has been a growing demand for deliveries of packages to houses etc. Thus, a system that manages deliveries has been required. With regard to this, for example, Japanese Unexamined Patent Application Publication No. 2009-274875 discloses a system that generates a delivery route using a map database that stores road data, building data, and site data.

SUMMARY

The system disclosed in Japanese Unexamined Patent Application Publication No. 2009-274875 assumes that human beings make deliveries. That is, a case in which an autonomous mobile robot make deliveries is not considered in the above system. When a delivery is made by an autonomous mobile robot, whether or not the autonomous mobile robot successfully completes the delivery depends on an environment of a delivery destination. In an environment in which it is difficult to reach a delivery destination, for example, the autonomous mobile robot may fail to make a delivery.

The present disclosure has been made in view of the aforementioned circumstances, and aims to provide a management system, a management method, and a program capable of reducing occurrence of delivery failures by an autonomous mobile robot.

One aspect of the present disclosure to attain the above object is a management system configured to manage a delivery by an autonomous mobile robot that delivers a package to a delivery destination, the management system including: an environment information acquisition unit configured to acquire environment information, which is information regarding an environment that inhibits a delivery by the autonomous mobile robot in the vicinity of the delivery destination; and a delivery determination unit configured to determine whether or not to cause the autonomous mobile robot to deliver the package to the delivery destination based on the environment information.

According to the management system, it is determined whether or not to make a delivery by an autonomous mobile robot based on information on an environment that inhibits a delivery made by the autonomous mobile robot. Therefore, it is possible to prevent a package from being delivered to a delivery destination to which an autonomous mobile robot may not be able to make a delivery, whereby it is possible to reduce occurrence of delivery failures by the autonomous mobile robot.

In the above aspect, the environment information acquisition unit may acquire, as the environment information, information regarding an environment that inhibits movement of the autonomous mobile robot for making a delivery.

According to this structure, it is determined whether or not to make a delivery by an autonomous mobile robot based on information on the environment which inhibits movement of the autonomous mobile robot. Therefore, occurrence of a delivery failure, which is due to difficulty in moving, can be prevented.

In the above aspect, the information regarding the environment that inhibits movement of the autonomous mobile robot for making the delivery may be information indicating features of the ground in the vicinity of the delivery destination.

According to this structure, occurrence of a delivery failure, which is due to difficulty in the movement on the ground, can be prevented.

In the above aspect, the information indicating the features of the ground may be information indicating the presence or the absence of waste left on the ground, the environment information acquisition unit may further acquire a collection schedule of the waste from the ground, and the delivery determination unit may determine whether or not to make a delivery of the package to the delivery destination based on the collection schedule and a delivery schedule of the package.

According to the above management system, after it is checked whether or not waste left on the ground is still left as it is even at the time of delivery, it is determined whether or not it is possible to make a delivery. That is, it is determined whether or not it is possible to make a delivery taking into account whether the movement is actually disturbed by the presence of the above waste. Therefore, occurrence of delivery failures can be prevented more appropriately.

In the above aspect, the information regarding the environment that inhibits movement of the autonomous mobile robot for making the delivery may be meteorological information.

According to this structure, occurrence of a delivery failure, which is due to a meteorological condition, can be prevented.

In the above aspect, the delivery destination may be a storage container for receiving the package, and the environment information acquisition unit may acquire, as the environment information, information regarding an environment that inhibits storage of the package in the storage container by the autonomous mobile robot.

According to the above management system, it is determined whether or not to make a delivery by an autonomous mobile robot based on information regarding an environment which inhibits storage of the package in the storage container by the autonomous mobile robot. Therefore, occurrence of a delivery failure, which is due to difficulty in the storage operation, can be prevented.

In the above aspect, the information regarding the environment that inhibits storage of the package in the storage container by the autonomous mobile robot may be information indicating the position of the storage container or the capacity of the storage container.

According to this structure, the occurrence of a delivery failure, which is due to an inability of storage because of the position or the capacity of the storage container, can be prevented.

In the above aspect, the delivery determination unit may determine whether or not to cause the autonomous mobile robot to deliver the package to the delivery destination based on the ability of the autonomous mobile robot and the environment information.

According to this structure, it is determined whether or not to make a delivery by an autonomous mobile robot in accordance with the ability of the autonomous mobile robot. Accordingly, it is possible to reduce occurrence of delivery failures by the autonomous mobile robot more accurately.

Another aspect of the present disclosure to attain the above object is a management method in which an information processing apparatus manages a delivery by an autonomous mobile robot that delivers a package to a delivery destination, the management method including: acquiring environment information, which is information regarding an environment that inhibits a delivery by the autonomous mobile robot in the vicinity of the delivery destination; and determining whether or not to cause the autonomous mobile robot to deliver the package to the delivery destination based on the environment information.

According to this management method, it is determined whether or not to make a delivery by an autonomous mobile robot based on information on an environment that inhibits a delivery made by the autonomous mobile robot. Therefore, it is possible to prevent a package from being delivered to a delivery destination to which an autonomous mobile robot may not be able to make a delivery, whereby it is possible to reduce occurrence of delivery failures by the autonomous mobile robot.

Another aspect of the present disclosure to attain the above object is a program for causing a computer that manages a delivery by an autonomous mobile robot that delivers a package to a delivery destination to execute the following steps of: acquiring environment information, which is information regarding an environment that inhibits a delivery by the autonomous mobile robot in the vicinity of the delivery destination; and determining whether or not to cause the autonomous mobile robot to deliver the package to the delivery destination based on the environment information.

According to this program, it is determined whether or not to make a delivery by an autonomous mobile robot based on information on an environment that inhibits a delivery made by an autonomous mobile robot. Therefore, it is possible to prevent a package from being delivered to a delivery destination to which an autonomous mobile robot may not be able to make a delivery, whereby it is possible to reduce occurrence of delivery failures by the autonomous mobile robot.

According to the present disclosure, it is possible to provide a management system, a management method, and a program capable of reducing occurrence of delivery failures by an autonomous mobile robot.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, with reference to the drawings, an embodiment of the present disclosure will be described.

Figure 1:
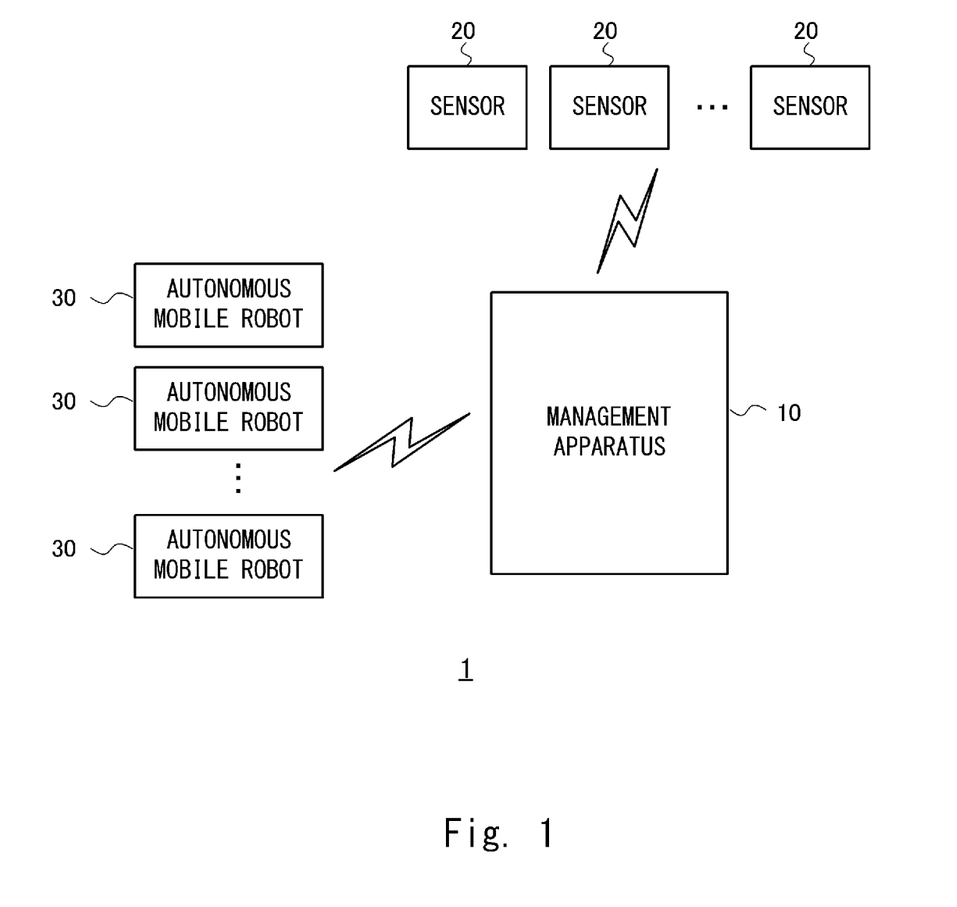
FIG. 1 is a schematic view showing one example of a system configuration of a delivery system according to an embodiment.

FIG. 1 is a schematic view showing one example of a system configuration of a delivery system 1 according to an embodiment. The delivery system 1 includes a management apparatus 10, a sensor 20, and an autonomous mobile robot 30. The delivery system 1, which is a system for managing a delivery by the autonomous mobile robot 30, is also referred to as a management system. In the delivery system 1, the management apparatus 10 is connected to the sensor 20 in such a way that the management apparatus 10 is able to communicate with the sensor 20. Further, the management apparatus 10 is also connected to the autonomous mobile robot 30 as necessary in such a way that the management apparatus 10 is able to communicate with the autonomous mobile robot 30.

The autonomous mobile robot 30, which is a robot that delivers a package to a delivery destination, autonomously moves. The delivery system 1 includes, for example, a plurality of types of autonomous mobile robots 30 having different abilities. While the autonomous mobile robot 30 is, for example, a robot that autonomously moves by traveling on the ground, it may be a robot that autonomously moves by flying in the air. Further, an autonomous mobile robot 30 that travels on the ground may be a robot that moves by driving the wheels or may be a robot that moves by driving a crawler (endless track). In this way, the delivery system 1 may include a plurality of types of autonomous mobile robots 30 having different moving abilities. The difference in the moving ability is due to a difference in the structure of the autonomous mobile robot 30, and a difference in the structure is not particularly limited. For example, the difference in the moving ability may be due to a difference in movement principle (e.g., whether the movement is made by wheels, by a crawler, or by flight), may be due to a difference in size (e.g., the size of a drive part such as the wheel or the crawler), or may be due to a difference in material (e.g., whether the material is a water resistant material). Depending on the difference in the moving ability of the autonomous mobile robot 30, the environment where the autonomous mobile robot 30 can move varies. For example, some autonomous mobile robots 30 cannot move when there is a step on the ground, whereas other autonomous mobile robots 30 are able to move even when there is a step on the ground if the height of the step is equal to or smaller than a predetermined height. Further, for example, some autonomous mobile robots 30 may be able to travel on puddles or on a gravel ground.

Further, the delivery system 1 may include a plurality of types of autonomous mobile robots 30 having different package delivery abilities. When, for example, the delivery destination is a storage container such as a delivery box or a mailbox for receiving a package, the autonomous mobile robot 30 cannot deliver the package to the delivery destination if the autonomous mobile robot 30 cannot reach the height of the storage container. While the difference in the package delivery ability is due to, for example, a difference in a range that the autonomous mobile robot 30 can reach in accordance with the structure of the autonomous mobile robot 30, there may be a difference in the package delivery ability due to other factors.

The autonomous mobile robot 30 may be, for example, a small-sized robot. Then the autonomous mobile robot 30 may be transported to a place near the delivery destination by a large-sized transport apparatus (e.g., a vehicle) that transports the autonomous mobile robot 30. The large-sized transport apparatus travels, for example, on a road where automobiles can pass, and transports the autonomous mobile robot 30 to a predetermined place near the delivery destination. The autonomous mobile robot 30 makes a delivery by autonomously moving to the delivery destination from the above place and handing the package to a person or a robot in a house, or storing the package in a storage container etc. at the delivery destination.

In order for the autonomous mobile robot 30 to successfully complete a delivery, the autonomous mobile robot 30 needs to have an ability required by the environment at the delivery destination. If the delivery of the package has been made using an autonomous mobile robot 30 that does not have the required ability, this autonomous mobile robot 30 fails to deliver the package. Therefore, in this embodiment, the failures can be prevented by acquiring environment information of the delivery destination in advance using the sensor 20.

The sensor 20, which is a sensor that senses an area in the vicinity of the delivery destination, detects environment information of the area in the vicinity of the delivery destination. Specifically, the area in the vicinity of the delivery destination is, for example, a space including the traffic line of the autonomous mobile robot 30 from a predetermined place near the delivery destination (e.g., a road closest to the delivery destination) to the delivery destination (e.g., the entrance or the storage container of the house of the specified person). The environment information is information regarding the environment that inhibits a delivery by the autonomous mobile robot 30. Specifically, the environment information may be, for example, information regarding an environment that inhibits the movement of the autonomous mobile robot 30 for the delivery (hereinafter it will be referred to as movement environment information) or may be information regarding an environment that inhibits storage of the package in the storage container by the autonomous mobile robot 30 (hereinafter it will be referred to as storage environment information).

The movement environment information is, for example, information indicating the features of the ground in the vicinity of the delivery destination. The information indicating the features of the ground may be, for example, information indicating the type of the ground such as concrete, grass, or gravel, information indicating the height of a step on the ground, information indicating the state of the ground which is due to the weather in the vicinity of the delivery destination (e.g., frozen road, accumulated snow, or puddles), or information indicating the presence or the absence of the waste left on the ground. Further, the movement environment information may be meteorological information (e.g., wind speed, weather, or temperature) that inhibits the movement. They are merely examples of the movement environment information and information on another factor that disturbs the movement of the autonomous mobile robot 30 may be detected as the movement environment information.

Further, the storage environment information may be, for example, information indicating the position such as the height of a storage container like a delivery box or a mailbox, or information indicating the capacity of the storage container. For example, as described above, it is possible that the autonomous mobile robot 30 may not be able to reach the storage container depending on the height of the storage container that is installed. In this case, information indicating the position of the storage container may be detected. Further, some storage containers may not have capacities large enough to accommodate packages. In this case, information indicating the capacity of a storage container, that is, the size of the storage container, may be detected. Note that they are merely examples of the storage environment information, and information on another factor that disturbs the storage in the storage container by the autonomous mobile robot 30 may be detected as storage environment information.

The sensor 20 may be fixedly installed in an area where a delivery is made in a dispersed manner, may be mounted on an autonomous mobile robot for detecting the environment information, or may be mounted on an autonomous mobile robot 30 that delivers a package. The sensor 20 transmits the detected environment information to the management apparatus 10.

Specifically, the sensor 20 may be any known sensor. For example, the sensor 20 may be a camera (image sensor) that captures images of an area in the vicinity of the delivery destination and acquires images including movement environment information or storage environment information. Further, the sensor 20 is not limited to a camera and may be a known sensor in accordance with the kind of the environment information to be detected. For example, a sensor such as a millimeter wave radar may be used as the sensor 20 in order to detect the features of the ground, an acceleration sensor mounted on a robot that travels on the ground may be used as the sensor 20, or a sensor that detects an amount of slip of the robot when it travels on the ground may be used as the sensor 20. Further, the sensor 20 may be a meteorological sensor such as an anemometer or a thermometer for detecting the weather.

Figure 2:
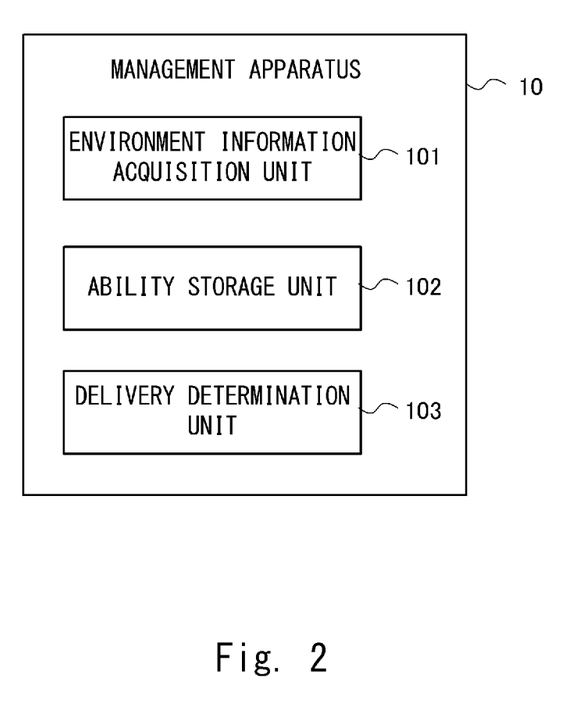
FIG. 2 is a block diagram showing one example of a functional configuration of a management apparatus according to the embodiment.

Next, the management apparatus 10 will be described. FIG. 2 is a block diagram showing one example of a functional configuration of the management apparatus 10. As shown in FIG. 2, the management apparatus 10 includes an environment information acquisition unit 101, an ability storage unit 102, and a delivery determination unit 103.

The environment information acquisition unit 101 acquires information regarding an environment that inhibits the delivery by the autonomous mobile robot 30 in the vicinity of the delivery destination, that is, the aforementioned environment information. The environment information acquisition unit 101 may acquire the environment information by receiving it from the above-mentioned sensor 20, acquire the environment information by receiving it from another apparatus that manages the environment information, or acquire environment information input by a user. The user may input information for specifying an area where the movement of the autonomous mobile robot 30 is prohibited (e.g., an area of the site where the traveling is prohibited) as the environment information.

The environment information acquisition unit 101 may acquire the environment information by analyzing the information received from the sensor 20 or the like. The environment information acquisition unit 101 may analyze the features or the state of the ground, the presence or the absence of waste left on the ground, the position or the capacity etc. of the storage container by performing, for example, known image recognition processing on images received from the sensor 20.

The environment information acquisition unit 101 reflects the acquired environment information in the map data of the area where a delivery is made. That is, the environment information acquisition unit 101 specifies at which point (which delivery destination) on the map the environment information has been acquired. When the environment information acquisition unit 101 has acquired, along with the environment information, positional information at the point of this environmental information, the environment information acquisition unit 101 associates this environment information with a point on the map using the above positional information. When, for example, the sensor 20 mounted on the autonomous mobile robot detects environment information, the autonomous mobile robot transmits the position where this environment information has been detected to the management apparatus 10. The environment information acquisition unit 101 may thereby acquire, along with the environment information, positional information regarding the point where this environment information is detected. Further, for example, the environment information acquisition unit 101 may acquire, from a user or another apparatus, along with the environment information, information indicating at which point this environment information has been acquired. Further, for a sensor 20 whose installation position is fixed, the environment information acquisition unit 101 may specify at which point (which delivery destination) on the map the environment information has been acquired based on information on the position where the sensor is installed that has been specified in advance.

The environment information acquisition unit 101 may further acquire other information. The environment information acquisition unit 101 may acquire, for example, a collection schedule of abandoned waste. The environment information acquisition unit 101 acquires, for example, the collection schedule from a management server of a cleaning company or the like.

The ability storage unit 102 stores ability information (specification) of each of the autonomous mobile robots 30 that make deliveries. This ability information includes information regarding the moving ability and the package delivery ability. When it is determined in the delivery determination unit 103 described later whether or not it is possible to cause the autonomous mobile robot 30 to make a delivery by referring only to the moving ability, the ability storage unit 102 may store only the moving ability. Likewise, when it is determined in the delivery determination unit 103 whether or not it is possible to cause the autonomous mobile robot 30 to make a delivery by referring only to the package delivery ability, the ability storage unit 102 may store only the package delivery ability.

The delivery determination unit 103 determines whether or not to cause the autonomous mobile robot 30 to deliver the package to the delivery destination based on environment information acquired by the environment information acquisition unit 101. When, for example, the delivery destination of the package is specified, the delivery determination unit 103 refers to a map in which the environment information is reflected and specifies the ability that is required to deliver the package to the delivery destination. The delivery determination unit 103 refers to the ability storage unit 102 and determines whether or not there is an autonomous mobile robot 30 having the required ability. Accordingly, the delivery determination unit 103 determines whether or not to cause the autonomous mobile robot 30 to deliver the package to the delivery destination. In this manner, the delivery determination unit 103 may determine whether or not to cause the autonomous mobile robot 30 to deliver the package to the delivery destination based on the ability of the autonomous mobile robot 30 and the environment information. According to this structure, it is determined whether to cause the autonomous mobile robot 30 to make a delivery in accordance with the ability of the autonomous mobile robot 30. It is therefore possible to reduce occurrence of delivery failures by the autonomous mobile robot 30 more accurately.

When, for example, there is a step on a movement path to the delivery destination, if there is an autonomous mobile robot 30 having a moving ability with which it can travel on a road with a step, the delivery determination unit 103 determines that it is possible for the autonomous mobile robot 30 to make a delivery. On the other hand, when there is no autonomous mobile robot 30 having a moving ability with which it can travel on the road with a step, the delivery determination unit 103 determines that it is impossible for the autonomous mobile robot 30 to make a delivery. In this case, the delivery determination unit 103 determines, for example, to make a delivery by a delivery person (human being). While a step has been described as an example above, in a case in which the environment information indicates another feature of the ground as well, the delivery determination unit 103 makes a determination in a similar way. Further, while the moving ability of the autonomous mobile robot 30 that travels on the ground has been described in the aforementioned example, the delivery determination unit 103 may make a similar determination also for an autonomous mobile robot 30 that flies. When, for example, the environment information indicates a wind speed, the delivery determination unit 103 determines whether or not it is possible to cause the autonomous mobile robot 30 to make a delivery depending on whether or not there is an autonomous mobile robot 30 that can fly even in an environment where the wind at the indicated wind speed is blowing.

The same is applicable to a case in which the environment information requires a certain package delivery ability. When, for example, the delivery destination is a storage container for receiving a package such as a delivery box and the environment information indicates the height of the storage container, the delivery determination unit 103 determines whether or not it is possible to cause the autonomous mobile robot 30 to make a delivery by determining whether or not there is an autonomous mobile robot 30 that can reach the above height. Further, when, for example, the delivery destination is a storage container and the environment information indicates the capacity of this storage container, the delivery determination unit 103 determines whether or not it is possible to cause the autonomous mobile robot 30 to make a delivery by determining whether the package to be delivered can be stored in the storage container. According to this structure, occurrence of a delivery failure, which is due to an inability of storage because of the position or the capacity of the storage container, can be prevented.

When, in particular, the environment information indicates that waste that disturbs the movement is left on the ground, the delivery determination unit 103 may determine whether or not the autonomous mobile robot 30 will deliver the package to the delivery destination based on a collection schedule of waste and a delivery schedule of a package. The ability of the autonomous mobile robot 30 required to deliver the package varies depending on whether the scheduled delivery date and time of the package is before or after the scheduled collection date and time of the waste. Therefore, when the scheduled delivery date and time of the package is before the scheduled collection date and time of the waste, the delivery determination unit 103 determines whether or not it is possible to make a delivery by an autonomous mobile robot 30 depending on whether there is an autonomous mobile robot 30 having a moving ability with which it can reach the delivery destination even when there is waste. On the other hand, when the scheduled delivery date and time of the package is after the scheduled collection date and time of the waste, the delivery determination unit 103 specifies the moving ability with which the autonomous mobile robot 30 can reach the delivery destination, assuming that there is no waste. Then the delivery determination unit 103 determines whether or not it is possible to cause the autonomous mobile robot 30 to make a delivery depending on whether or not there is an autonomous mobile robot 30 having the specified moving ability. According to this structure, after it is checked whether or not waste left on the ground is still left as it is even at the time of delivery, it is determined whether or not it is possible to make a delivery. That is, it is determined whether or not it is possible to make a delivery by determining whether or not this waste actually disturbs the movement. Therefore, occurrence of delivery failures can be prevented more appropriately.

The functions of the management apparatus 10 have been described above. The aforementioned functions of the management apparatus 10 are merely examples. Some of the aforementioned functions may be omitted and other functions may be added. When, for example, the environment information requires an ability equal to or higher than a predetermined level, the delivery determination unit 103 may determine whether or not it is possible to cause the autonomous mobile robot 30 to make a delivery by determining whether or not a package to be delivered has a predetermined property (e.g., expensive). When, for example, there is a step, a determination that the autonomous mobile robot 30 will not deliver an expensive package may be made. Further, the management apparatus 10 may have a function of generating a route in which the traveling environment satisfies predetermined conditions based on map data in which the environment information is reflected. For example, the management apparatus 10 may have a function of generating a route on which a person who uses a wheelchair can travel.

Figure 3:
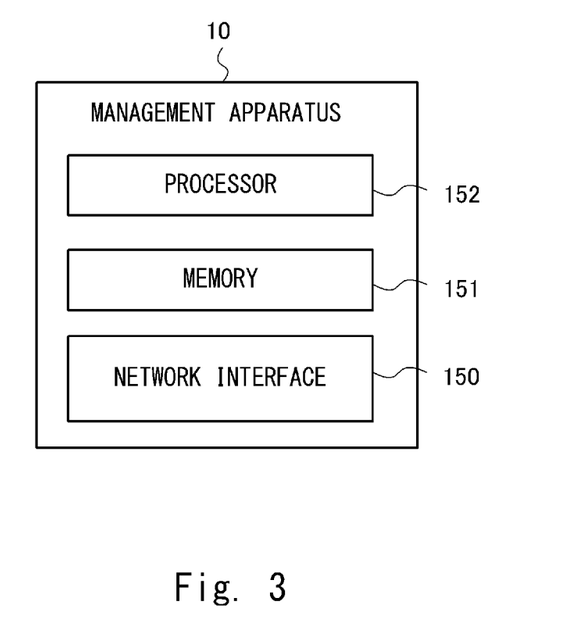
FIG. 3 is a block diagram showing one example of a hardware configuration of the management apparatus according to the embodiment.

Next, one example of a hardware configuration of the management apparatus 10 will be described. FIG. 3 is a block diagram showing one example of the hardware configuration of the management apparatus 10. As shown in FIG. 3, the management apparatus 10 includes a network interface 150, a memory 151, and a processor 152. The network interface 150, the memory 151, and the processor 152 are connected to one another via a data bus or the like.

The network interface 150 is used to communicate with any other apparatus such as the sensor 20. The network interface 150 may include, for example, a network interface card (NIC).

The memory 151 is composed of, for example, a combination of a volatile memory and a non-volatile memory. The memory 151 is used to store software (computer program) that includes one or more instructions and is executed by the processor 152, data to be used for various kinds of processing of the management apparatus 10 and the like. The aforementioned ability storage unit 102 may be implemented by the memory 151.

The processor 152 loads software (computer program) from the memory 151 and executes the loaded software (computer program), thereby performing processing of the aforementioned management apparatus 10.

The processor 152 may be a microprocessor, a Micro Processor Unit (MPU), or a Central Processing Unit (CPU). The processor 152 may include a plurality of processors.

As described above, the management apparatus 10 is an apparatus that functions as a computer and is also referred to as an information processing apparatus.

The aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 4:
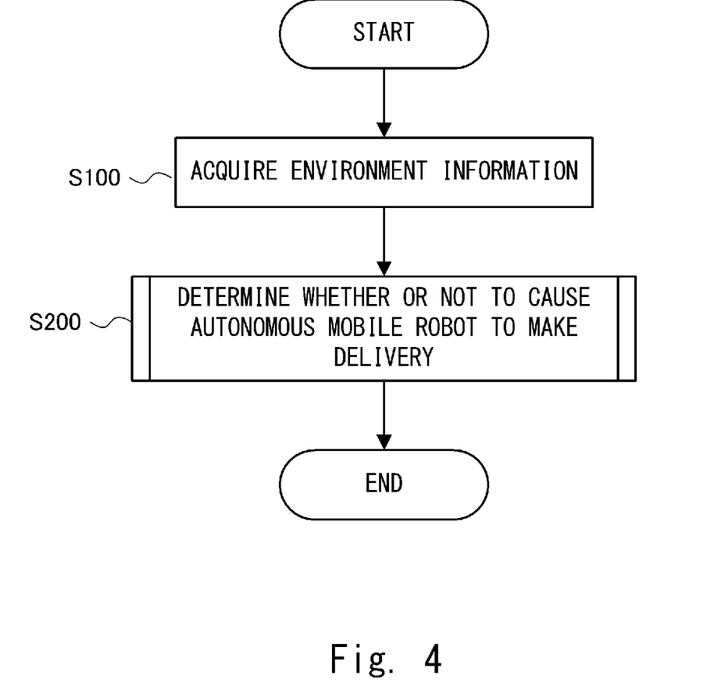
FIG. 4 is a flowchart showing one example of a flow of determination processing by the management apparatus according to the embodiment.

Next, a flow of determination processing performed by the management apparatus 10 will be described. FIG. 4 is a flowchart showing one example of the flow of the determination processing performed by the management apparatus 10. Hereinafter, with reference to the flowchart, a flow of processing will be described.

In Step S100, the environment information acquisition unit 101 acquires environment information via the sensor 20 or the like. As described above, the environment information acquisition unit 101 may further acquire a collection schedule.

Next, in Step S200, the delivery determination unit 103 determines whether or not to cause the autonomous mobile robot 30 to deliver the package to the specified delivery destination based on the information acquired in Step S100.

Figure 5:
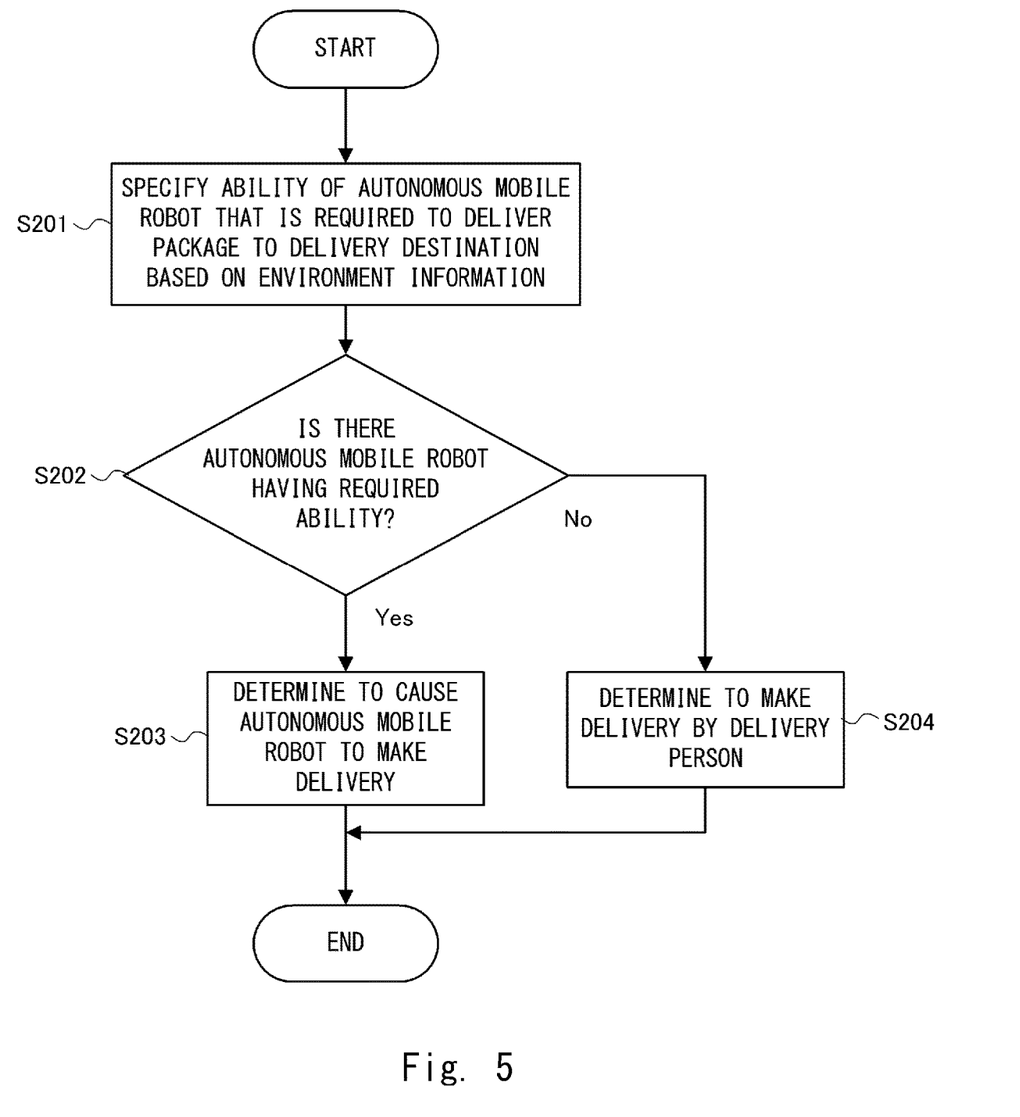
FIG. 5 is a flowchart showing one example of details of processing of Step S200 shown in FIG. 4.

FIG. 5 is a flowchart showing one example of the details of the processing of Step S200 shown in FIG. 4. In the following, with reference to FIG. 5, one example of processing in Step S200 will be described.

In Step S201, the delivery determination unit 103 specifies the ability of the autonomous mobile robot 30 that is required to deliver a package to the delivery destination based on the environment information regarding the delivery destination. When the environment information indicates the presence of waste on the movement path, the delivery determination unit 103 may refer to a collection schedule of the waste and specify the ability that is required for the delivery.

Next, in Step S202, the delivery determination unit 103 refers to the ability storage unit 102 and determines whether or not there is an autonomous mobile robot 30 having the ability specified in Step S201. When there is an autonomous mobile robot 30 having the required ability, the processing proceeds to Step S203. On the other hand, when there is no autonomous mobile robot 30 having the above ability, the processing proceeds to Step S204.

In Step S203, the delivery determination unit 103 determines to cause the autonomous mobile robot 30 having the required ability to make a delivery. When there are a plurality of autonomous mobile robots 30 having the required ability, the delivery determination unit 103 may determine that a delivery will be made by an autonomous mobile robot 30 having the minimum required ability among them.

On the other hand, in Step S204, the delivery determination unit 103 determines that it is impossible to cause the autonomous mobile robot 30 to make a delivery and determines to make a delivery by a delivery person.

The embodiment has been described above. In this embodiment, it is determined whether or not to cause the autonomous mobile robot 30 to make a delivery based on environment information, which is information regarding an environment that inhibits the delivery by the autonomous mobile robot 30. Therefore, it is possible to prevent a package from being delivered to a delivery destination to which an autonomous mobile robot 30 may not be able to make a delivery, whereby it is possible to reduce occurrence of delivery failures by the autonomous mobile robot 30. Further, this environment information may be the aforementioned movement environment information or may be the aforementioned storage environment information. It is therefore possible to prevent occurrence of a delivery failure, which is due to difficulty in the movement operation or storage operation. When, for example, the environment information is information indicating the features of the ground, occurrence of a delivery failure, which is due to difficulty in the movement on the ground, can be prevented. Further, when, for example, the environment information includes meteorological information, occurrence of a delivery failure, which is due to a meteorological condition, can be prevented.

The present disclosure is not limited to the above embodiments and may be changed as appropriate without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A management system configured to manage a delivery by an autonomous mobile robot that delivers a package to a delivery destination, the management system comprising:
    an environment information acquisition unit configured to acquire environment information, which is information regarding an environment that inhibits a delivery by the autonomous mobile robot in the vicinity of the delivery destination;
    a delivery determination unit configured to determine whether or not to cause the autonomous mobile robot to deliver the package to the delivery destination based on the environment information; and
    a millimeter wave radar configured to detect a type of ground, and determine whether there is a step on a movement path to the destination;
    wherein, upon determination that there is the step on the movement path to the destination, the delivery determination unit determines whether the autonomous mobile robot can travel on the movement path with the step; and
    upon determination that the autonomous mobile robot cannot travel on the movement path with the step, the delivery determination unit determines that the delivery should be made by a human rather than the autonomous mobile robot.

2. The management system according to claim 1, wherein the environment information acquisition unit acquires, as the environment information, information regarding an environment that inhibits movement of the autonomous mobile robot for making a delivery.

3. The management system according to claim 2, wherein the information regarding the environment that inhibits movement of the autonomous mobile robot for making the delivery is information indicating features of a ground in the vicinity of the delivery destination.

4. The management system according to claim 3, wherein
    the information indicating the features of the ground is information indicating a presence or an absence of waste left on the ground,
    the environment information acquisition unit further acquires a collection schedule of the waste from the ground, and
    the delivery determination unit determines whether or not to make a delivery of the package to the delivery destination based on the collection schedule and a delivery schedule of the package.

5. The management system according to claim 2, wherein the information regarding the environment that inhibits movement of the autonomous mobile robot for making the delivery is meteorological information.

6. The management system according to claim 1, wherein
    the delivery destination is a storage container for receiving the package, and
    the environment information acquisition unit acquires, as the environment information, information regarding an environment that inhibits storage of the package in the storage container by the autonomous mobile robot.

7. The management system according to claim 6, wherein the information regarding the environment that inhibits storage of the package in the storage container by the autonomous mobile robot is information indicating the position of the storage container or the capacity of the storage container.

8. The management system according to claim 1, wherein the delivery determination unit determines whether or not to cause the autonomous mobile robot to deliver the package to the delivery destination based on the ability of the autonomous mobile robot and the environment information.

9. The management system according to claim 1, wherein when there is the step on the movement path to the destination and the package has a predetermined property, the delivery determination unit makes a determination that the autonomous mobile robot will not deliver the package.

10. A management method in which an information processing apparatus manages a delivery by an autonomous mobile robot that delivers a package to a delivery destination, the management method comprising:
    acquiring environment information, which is information regarding an environment that inhibits a delivery by the autonomous mobile robot in the vicinity of the delivery destination;
    determining whether or not to cause the autonomous mobile robot to deliver the package to the delivery destination based on the environment information;
    detecting, by a millimeter wave radar, a type of ground and determining whether there is a step on a movement path to the destination;
    upon determination that there is the step on the movement path to the destination, determining whether the autonomous mobile robot can travel on the movement path with the step; and upon determination that the autonomous mobile robot cannot travel on the movement path with the step, determining that the delivery should be made by a human rather than the autonomous mobile robot.

11. A non-transitory computer readable medium storing a program for causing a computer that manages a delivery by an autonomous mobile robot that delivers a package to a delivery destination to execute the following steps of:

acquiring environment information, which is information regarding an environment that inhibits a delivery by the autonomous mobile robot in the vicinity of the delivery destination;

determining whether or not to cause the autonomous mobile robot to deliver the package to the delivery destination based on the environment information;

detecting, by a millimeter wave radar, a type of ground and determining whether there is a step on a movement path to the destination;

upon determination that there is the step on the movement path to the destination, determining whether the autonomous mobile robot can travel on the movement path with the step; and upon determination that the autonomous mobile robot cannot travel on the movement path with the step, determining that the delivery should be made by a human rather than the autonomous mobile robot.

* * * * *